May 13, 1969  F. J. KATZ ET AL  3,443,756
LOW VOLUME SPRAY SYSTEM HAVING NOZZLE ORIFICE CONFIGURATION
FOR PRODUCING EQUAL SIZE DROPLETS
Filed June 15, 1966  Sheet 1 of 2

INVENTORS
FRIEDRICH J. KATZ
GENE F. PFEIFFER
BY CHARLES E. SORENSON

Attorney

INVENTORS
FRIEDRICH J. KATZ
GENE F. PFEIFFER
BY CHARLES E. SORENSON

Warren D. Hackbert
Attorney

United States Patent Office 3,443,756
Patented May 13, 1969

3,443,756
LOW VOLUME SPRAY SYSTEM HAVING NOZZLE ORIFICE CONFIGURATION FOR PRODUCING EQUAL SIZE DROPLETS
Friedrich J. Katz, Gene F. Pfeiffer, and Charles E. Sorenson, Evansville, Ind., assignors to Hahn, Inc., Evansville, Ind., a corporation of Indiana
Filed June 15, 1966, Ser. No. 557,788
Int. Cl. B05b 7/04, 3/08
U.S. Cl. 239—214.25   3 Claims

ABSTRACT OF THE DISCLOSURE

A sprayer system and nozzle characterized by a combination of elements which permit the use of small volumes of chemical concentrate dispensed in aerosol or mist-like form through a unique orifice configuration in each sprayer nozzle and having particular adaptability for use on a conventional self-powered vehicle, such as a high clearance sprayer.

The present invention relates to a sprayer system and nozzle, and more particularly to a new and novel low volume sprayer system having important adaptability for use on vehicles and including a new and novel orifice configuration in the spray nozzles employed therewith.

As is known, sprayer systems now in use on agricultural vehicles, for example, require large volume storage tanks for the dispensed chemical, and, in this latter connection, the user must make a mixture thereof, either, for example, from a powder or a liquid condensate, with water. The large volume requirement is necessary so that the user can achieve more spraying without refilling the storage tank. In any event, even with the large tank requirements, the user still had to return to the chemical or water source from time to time in order to complete the spraying operation, resulting in loss of spraying time as well as fuel and like expense in traveling to and from such chemical or water source.

By virtue of the instant invention, the applicants herein have provided a new and novel spray system, described as a low volume spray system, in that the combination of elements making up the system permit the use of small volumes of chemical concentrate dispensed in aerosol or mist-like form. Typically, and by way of example, the instant invention can utilize four ounces of concentrated chemical for achieving the spraying of one acre of ground, therefore minimizing the storage requirements on the agricultural vehicle and, at the same time, permitting greatly increased acreage spraying action before any necessity of refilling the chemical storage tank.

The applicants' invention represents a new and novel approach to vehicle mounted spraying equipment, where the equipment is quite compact, operating off a conventional power source found on the vehicle. Additionally, and to achieve even more optimum results, the spray nozzles forming part of the instant low volume sprayer system are each defined by a unique new and novel orifice configuration, expressed by a particular formula for optimum dispensing action. In other words, not only is the sprayer system representative of new and novel invention, but the orifice defined in each spray nozzle also adds to the system, and permits results not achievable or in use heretofore.

Broadly, the instant low volume sprayer system comprises a primer mover of any conventional type; an air compressor in the form of an air injection pump having a pressure control valve; an air filter; a carburetor; a liquid chemical storage tank; a metering device in the form of a thin plate orifice, for example; a valve; a mixing and distribution chamber having improved agitation power; and, the aforesaid spray nozzle having the new and novel specialized orifice configuration. The preceding components are so arranged for simple mounting on conventional self-powered vehicles such as a high clearance sprayer, for example, being representative of ready installation and highly effective operating results.

Accordingly, the principal object of the present invention is to provide a new and novel vehicle mounted low volume sprayer system.

Another object of the present invention is to provide a new and novel low volume sprayer system for agricultural purposes having sprayer nozzles each including a unique orifice configuration for highly effective spraying operation.

A further object of the present invention is to provide a new and novel low volume sprayer system and nozzle having particular adaptability to self-powered agricultural vehicles, such as high clearance sprayers, for example.

A still further and more general object of the present invention is to provide a new and novel sprayer system and nozzle arrangement which is readily operated from a conventional prime mover for the vehicle, which is simple to install, which represents a minimum of operating maintenance, which permits increased acerage spraying coverage without the necessity of frequent chemical or water replenishment, which includes a distribution chamber having new and improved agitating power, which represents a savings in spraying time to the operator, which is representative of economies insofar as equipment is concerned, and which lends itself to ready assembly of the components thereof.

Other objects and a better understanding of the present invention will become more apparent from the following description, taken in conjunction with the accompanying drawings, wherein FIG. 1 is a representative view in elevation of a low volume sprayer system in accordance with the applicants' new and novel invention;

Figure 1:
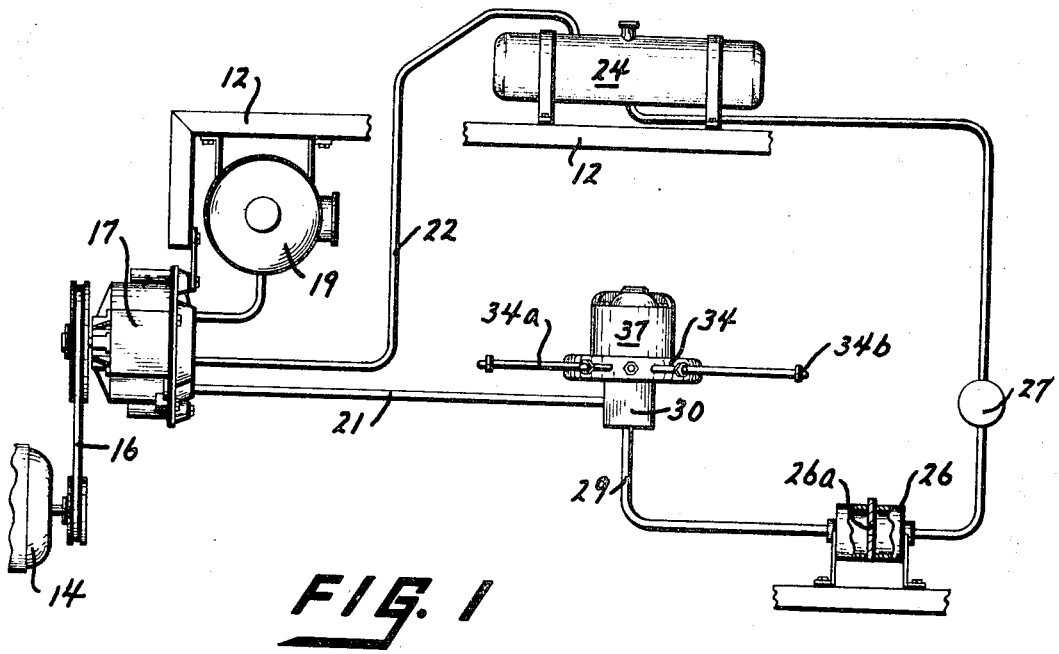
FIG. 1A is a fragmentary view of another possible conduit arrangement for the low volume sprayer system of FIG. 1.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled in the art to which the invention relates.

Referring now to the figures, the applicants' new and novel low volume sprayer system is shown herein apart from any detailed structural environment, as, for example, that of a self-propelled high clearance agricultural sprayer on which it is importantly used. Obviously, the instant invention has adaptability for use on virtually any type of vehicle with a variety of end spraying results.

In any event, the system is mounted on framework 12 forming a part of the desired vehicle, being operated by the prime mover 14 conventionally employed on such equipment. An air compressing device 17, in the form of an air injection pump, for example, is typically driven through belt means 16 powered by the prime mover 14. Although conventional, and, therefore, not shown in the drawings, the basis of such air injection pump 17 is a driven rotor having rotatable vanes which produce three chambers within the housing, viz. intake, compression, and exhaust. In typical operation, the movement of each vane completes a pumping cycle every revolution of the rotor.

The air compressing device or air injection pump 17 has an air filter 19 communicating with the intake thereof, where the output assumes two paths, one a conduit 21 which communicates with a mixing device or carburetor 30, and another which includes a conduit 22 and, if desired, a portion of conduit 21 up to a separating joint where conduit 22 may begin (see FIG. 1A in this latter connection); a chemical storage tank 24; a metering device 26, such as a thin-walled orifice 26a; a conventional valve 27; and, a conduit 29 leading from such valve 27 to the carburetor 30.

Preferably, the carburetor 30 is disposed immediately below and feeds directly into a manifold or distribution chamber 34, where the latter has one or more arms 34a extending therefrom, where, in the event of several arms 34a, each is preferably, but not necessarily, substantially equidistant in length. In a typical installation on a high clearance agricultural sprayer, the arms 34a, in the form of flexible hoses, extend from a supporting boom (not shown), creating a lateral length over the crops being sprayed.

Figure 3:
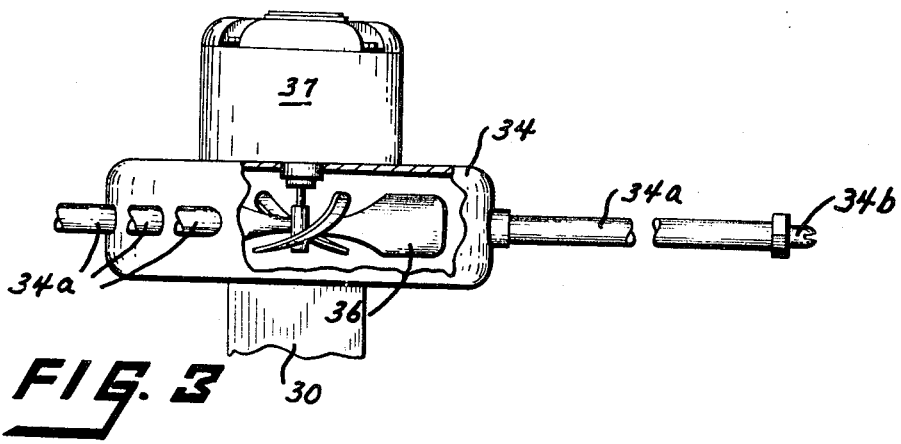
FIG. 3 is a view in elevation, partly in vertical section, showing certain details of the new and novel distribution chamber of the invention; and, FIG. 4 is another view of the orifice configuration of FIG. 2, but showing, additionally, the mathematical legends therefor.

With particular reference now to FIG. 3, the distribution chamber 34 has a rotatable blade 36 disposed therewithin, driven by a motor 37, for purposes of agitation. In this connection, such phase of the invention permits a more homogeneous spray to be achieved from each of the arms 34a, i.e. assures good mixing of the chemical with the air after atomization in the carburetor 30.

Figure 1A:
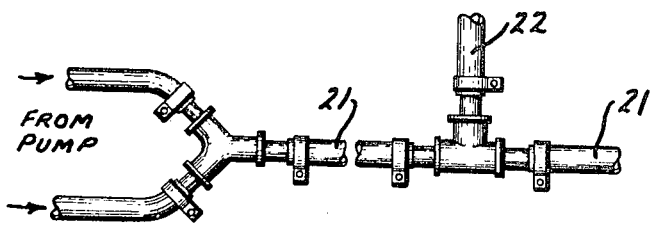

While the unique configuration of each nozzle orifice 34b at the ends of the arms 34a will be described more fully herebelow in connection with FIGS. 2 and 4, in use, the prime mover drives the air compressing device or injection pump 17, pressurizing the chemical storage tank 24 through conduit 22, and, if used, a portion of conduit 21 (also see FIGS. 1 and 1A). On the other hand, pressurized air is carried by conduit 21 to the air horn side of the carburetor or mixing device 30. Liquid chemical from the chemical storage tank 24 is metered at 26 through the orifice 26a, and when the valve 27 is open, such liquid chemical flows into the carburetor 30 where venturi action atomizes same into the air stream.

From the carburetor 30, the atomized chemical air mixture flows into the distribution chamber 34 where it is manifolded to the spray nozzles 34b at the end of each of the spray arms 34a. At the spray nozzles 34b, a sudden release of pressure from that of the air compressor to atmospheric pressure further atomizes the liquid chemical into the air stream. The flow of the liquid chemical from the storage tank 24 to the metering device 26 is accomplished by either gravity or pressure-inducing means, other than pressure from conduit 21 which serves to balance the pressure in the carburetor 30 against the pressure in the chemical storage tank 24.

With the aforedescribed agitating action brought about by the rotatable blade 36 in the distribution chamber 34, highly effective spraying action is achieved, without the necessity of frequent refilling of the chemical or water supply, as has been the instance heretofore. Obviously, many type spraying actions can be achieved, as, for example, the spraying of pesticides, fungicides and herbicides.

Figure 2:
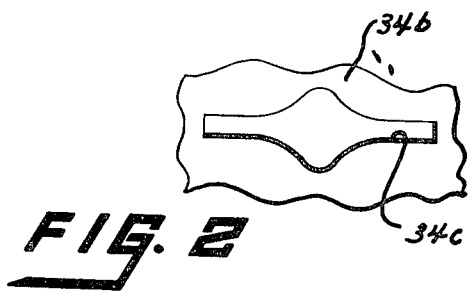
FIG. 2 is an enlarged view of the new and novel orifice configuration forming part of the sprayer nozzles in the instant sprayer system.
Figure 4:
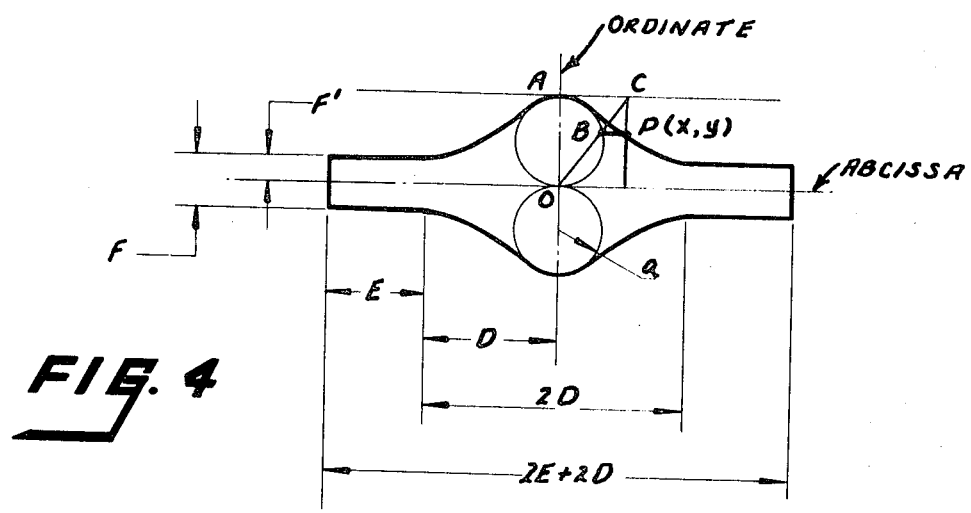

With reference now to FIGS. 2 and 4, in order to accomplish the effective results achieved by the applicants' new and novel invention, another important contribution resides in the orifice configuration 34c in each spray or discharge nozzle 34b. As a matter of geometry, and with particular reference to FIG. 4, in order to achieve the orifice configuration providing optimum spraying action, a circle of radius $a$ is drawn tangent to the X-axis through the origin O, where the Y-axis further intercepts such circle at point A. A tangent to the circle is then drawn at point A parallel to the X-axis.

Thereafter, from the origin O, a secant is drawn meeting the circle at B and the tangent to the circle at C. The locus P $(x, y)$ of the projection of point B upon the Y-ordinate of point C defines the curved portion of the optimum orifice, where, it should be understood, the orifice is symmetrical about the major ordinate and the major abcissa.

Expressed mathematically, the locus or the curved portion is as follows:

$$Y = \frac{8a^3}{X^2 + 4a^2}$$

between the limits of $X = +D$ and $X = -D$, where $D = 3.032a$, and where $0 < a \leq 1$, $a$ being in any unit of measurement.

The following relations further define the over-all orifice configuration:

$$E = 2.516a$$
$$F = 1.258a$$
$$F' = .629a$$

all readily apparent from an examination of the legends on FIG. 4.

From the preceding, it should be understood that the applicants herein have provided a new and novel spray system which permits optimum application of liquid chemical in atomized form without the necessity of frequent mechanical or hand mixing of chemicals in a large storage tank. In contrast, a small chemical supply and storage tank is usable and, moveover, with the aforestated orifice configuration, very effective spraying action is achieved. In addition, with the agitation of the chemical with the air in the distribution chamber, further advantages are accomplished to the benefit of the user.

The spraying system described hereabove is susceptible to various changes within the spirit of the invention. For example, the storage tank may assume various shapes, and, of course, other types of metering device may be employed.

We claim:

1. A low volume spraying system comprising a device for compressing air, a device for mixing said air with a liquid communicating with said air compressing device to define an air path, another path between said air compressing device and said mixing device including a storage tank for said liquid and a metering device, means flowing said liquid from said storage tank to said mixing device, a manifold communicating with said mixing device beyond the junction of said air path and said another path, rotatable agitating means disposed within said manifold, and at least one spray arm extending from said manifold and having a spray nozzle at the end thereof.

2. The low volume spraying system of claim 1 where said spray nozzle has an orifice with the locus of its curved portion symmetrical about an ordinate axis and an abcissa axis mathematically expressed as $$Y = \frac{8a^3}{X^2 + 4a^2}$$

between the limits of $X = +D$ and $X = -D$, and where $0 < a \leq 1$, and in terms of $a$, $D = 3.032$, $E = 2.516a$, $F = 1.258a$ and $F' = .629a$, $a$ being the radius of circles originating along the ordinate axis tangent to the abcissa axis in any unit of measurement;

D being the distance from the ordinate axis to the point where the locus of the curved portion intercepts a line parallel with and F' distance from the abcissa axis;

E being the distance along a line parallel with and F' distance from the abcissa axis to its interception with distance D;

F being defined as the distance along a line parallel with the ordinate axis and D plus E distance therefrom; and, F' being defined as one-half the distance along line F, symmetrical with respect to the abcissa axis.

3. A spray nozzle orifice configuration having the locus of its curved portion symmetrical about an ordinate axis and an abcissa axis mathematically expressed as $$Y = \frac{8a^3}{X^2 + 4a^2}$$

between the limits of $X = +D$ and $X = -D$, and where $0 < a \leq 1$, and in terms of $a$, $D = 3.032$, $E = 2.516a$, $F = 1.258a$ and $F' = .629a$, $a$ being the radius of circles originating along the ordinate axis tangent to the abcissa axis in any unit of measurement;

D being the distance from the ordinate axis to the point where the locus of the curved portion intercepts a line parallel with and F' distance from the abcissa axis;

E being the distance along a line parallel with and F' distance from the abcissa axis to its interception with distance D;

F being defined as the distance along a line parallel with the ordinate axis and D plus E distance therefrom; and, F' being defined as one-half the distance along line F, symmetrical with respect to the abcissa axis.

References Cited

UNITED STATES PATENTS

| 1,993,727 | 3/1935 | Adam | 239—597 |
| 2,077,257 | 4/1937 | Ofeldt | 239—8 |
| 2,841,060 | 7/1958 | Coppage | 239—310 X |
| 2,860,918 | 11/1958 | White et al. | 239—366 X |
| 2,868,584 | 1/1959 | Faust | 239—373 X |

FOREIGN PATENTS

| 490,064 | 11/1918 | France. |
| 572,854 | 10/1945 | Great Britain. |

M. HENSON WOOD, JR., *Primary Examiner.*

HOWARD NATTER, *Assistant Examiner.*

U.S. Cl. X.R.

239—222, 310, 366, 373, 601